Patented June 29, 1937

2,085,666

UNITED STATES PATENT OFFICE 2,085,666

MANUFACTURE OF SOLVENTS BY FERMENTATION

James F. Loughlin, Milwaukee, Wis.

No Drawing. Application February 25, 1935,
Serial No. 8,107

8 Claims. (Cl. 195—13)

My invention relates to the manufacture of solvents by fermentation and especially to procedural methods whereby economies can be effected in the conduct of such fermentations.

In the production of solvents by bacterial fermentation, such as butyl alcohol, acetone and isopropyl alcohol by the fermentation of sugary or non-starch carbohydrate mashes, the bacteria do not convert all of the fermentable material in the mash. Heretofore, this residual fermentable material was thrown away after the solvents were removed from the beer since the residue was considered an almost worthless substance. This waste was roughly proportional to the concentration of the carbohydrate in the original mash. On the other hand, it was the practice to use as high carbohydrate concentration as possible without greatly reducing the sugar consumption, thereby obtaining as high a concentration of solvents in the beer as possible. This was the method of balancing the steam distillation cost, the cost of plant equipment and the operating cost against the loss of carbohydrate and other material.

For example, it was found in fermenting sugary mashes with bacteria, such as clostridium saccharobutyl-acetonicum which is described in my U. S. Patent 1,992,921, and with clostridium saccharobutyl-isopropyl-acetonicum described in my U. S. patent application Serial Number 648,985, that when the sugar concentration of the mash at the beginning of fermentation was of the order of 3% or 4%, a high consumption of the sugar was obtainable but the concentration of solvents in the beer was low. In such a case the concentration of solvents in the beer could be around 1.0 gram to 1.3 grams per 100 cc. of beer with a sugar consumption of about 90% of the total sugar mashed. While this result is considered satisfactory from the standpoint of fermentation alone, the concentration of solvents in the beer is low, and the removal of these solvents from the beer required large amounts of steam per unit of solvents recovered, and large expenditures for a plant and equipment which was large enough to handle the mash and the beer for a given volume of solvents were required. In general this is in accord with all bacterial fermentations of the kind described.

In accordance with my invention these expenditures are reduced and the loss of carbohydrate is reduced. The process comprises in general the carrying out of the bacterial fermentation in which butyl alcohol or possibly other organic compounds, such as solvents are produced. The beer is then treated to remove the organic compounds, as by distillation methods, leaving a slop which contains some fermentable sugars. This slop is then subjected to a yeast fermentation by means of which the final fermentable sugar content can be carried to a lower value than in a bacterial fermentation. By the removal of the solvents which are produced in the bacterial fermentation and thereafter applying yeast fermentation, I find that the yeast fermentation is more rapid and complete and gives better yields of ethyl alcohol, than are attainable with yeast in the presence of the solvents produced by the bacterial fermentation, and I avoid mechanical losses of butyl alcohol or other solvents by the action of the gases produced in the progress of the yeast fermentation. This procedure results in a considerable increase in the yield of the solvents produced by the bacteria as well as an increased recovery of ethyl alcohol per unit of fermentable sugar mashed, over that which can be accomplished if the yeast fermentation is carried out in the presence of the solvents produced by the bacteria.

Therefore, it is among the objects of my invention to provide more economical methods of manufacturing solvents.

Another object of the invention is to provide for the use of mashes which have a high concentration of fermentable carbohydrate and at the same time if utilizing a greater proportion of this carbohydrate than could be utilized in mashes of such concentration solely by yeast fermentation or solely by bacterial fermentation.

A still further object of the invention is to provide for the maximum production of solvents, such as butyl alcohol, acetone and isopropyl alcohol which can be obtained in a given plant equipment, together with the maximum utilization of the carbohydrate originally mashed.

Other objects of my invention will appear, and the invention will be more clearly understood from the following description. A specific illustration of the manner of practicing the invention will now be described.

A sterile mash containing 6.32% by weight of fermentable sugar was made with molasses and containing sufficient nutrients for the proper functioning of the bacteria. This was inoculated with an active culture of clostridium saccharobutyl-acetonicum, the mash being at a temperature of about 36 degrees C. The mash was then allowed to ferment by the action of the bacteria and the bacterial fermentation was completed in about 65 to 70 hours. The beer contained 1.628 grams of total solvents consisting of butyl alcohol and acetone, and they were removed by distillation. These solvents amounted to 25.9% by weight of the original sugar mashed. The sugar consumption was 76.5% of the sugar mashed, the remainder of the fermentable sugar being in the hot slop after the above solvents were removed.

Besides the fermentable sugars, this slop contained acids which were produced in the bacterial fermentation and nutrients, both of which are beneficial to yeast fermentation. The slop had a titratable acidity of about 2.0 to 3.5 cc. of tenth normal NaOH per 10 cc. of slop and an abundance of nitrogenous matter which could be utilized by yeast. Moreover the slop was in a sufficiently pasteurized condition for yeast fermentation. All these favorable conditions were established by the bacterial fermentation together with the distillation process, which taken together constitute a conditioning process for the yeast mash.

This conditioned slop had a sugar content of 1.676 grams per 100 cc. of slop, and after cooling to 30 degrees C. was inoculated with an active yeast culture and allowed to ferment, the yeast fermentation being carried out in accordance with well known practices. This fermentation was completed in about 24 hours. The finished beer contained 0.313 gram of sugar per 100 cc. and an equivalent of 0.632 gram of absolute ethyl alcohol per 100 cc., and the alcohol was removed from the beer by distillation.

In this particular run 96.5% of the original fermentable sugar was fermented, yielding 34.7% by weight of the total sugar mashed as solvents. Thus it will be seen that 2.19 grams of solvents are obtained from 100 cc. of the original mash, 1.628 grams being butyl alcohol and acetone, and 0.566 gram being ethyl alcohol.

As compared with the bacterial fermentation of a dilute sugar solution which was described hereinbefore, it will be seen that the over all sugar consumption is considerably higher, that more butyl alcohol and acetone are obtained per unit of beer and that the water handled in the production of the butyl alcohol and acetone amounts to only about 60% of that handled when dilute sugar solutions are fermented. In the illustration, the nitrogenous residue in the slop from the bacterial fermentation was utilized, less sugar was wasted, and the value of the ethyl alcohol more than off-set the cost of fermenting and distilling the residual sugar.

Another 6.32% sugar mash was fermented in the same manner as the previously described mash of this concentration, except that the yeast was inoculated into the beer without removing the butyl alcohol and acetone. By this method 1.998 grams of solvents were obtained per 100 cc. of the original mash, 1.628 grams being butyl alcohol and acetone, and 0.37 gram being ethyl alcohol, 89.5% of the original sugar mashed was fermented, and the yield as solvents was 31.6% of the total sugar mashed. This fermentation was completed in about 72 hours. This mash fermented more slowly and less completely than the previously described mash of the same sugar concentration.

Yeast fermentation can desirably be carried on in mashes which contain higher or lower concentrations of sugar than those contained in the described slop, and carbohydrates which are fermentable by yeast can be added to the slop if desired. In cases where it is desired to increase the production of ethyl alcohol further economies in the process can be attained. Instead of cooling the slop directly after the butyl alcohol and acetone are removed, I may add molasses to the hot slop thereby pasteurizing the molasses and bringing the sugar concentration to a desired point, say 10% by weight of the slop mash. If any preliminary acidification or neutralization of the latter mash is necessary, or other additions are to be made, this can be done into the hot uncooled slop. These mashes have been found to ferment out rapidly and fully as well, if not better than yeast fermentations on original molasses. These slops have been found suitable for the simultaneous production of ethyl alcohol and glycerol by means of yeast in accordance with known methods. A great variety of organic solvents can be made by applying various bacteria.

I have also found that slops from saccharified cellulose mashes, such as those from waste sulphite liquors as described in my copending application Serial No. 290 filed January 3, 1935, can be utilized in the manner described herein with satisfactory results.

When fermenting with some types of bacteria which are capable of producing organic solvents, it has been found desirable in order to obtain the best fermentation results to invert the polysaccharides contained in the carbohydrate mash material to the more easily fermentable monosaccharides, such as dextrose and levulose. This can be conveniently done by acidifying and heating sufficiently to cause inversion.

The invention is not necessarily limited to the use of the bacteria mentioned herein, or to those which ferment only non-amylaceous carbohydrate material and produce normal butyl alcohol as the main or one of the main products of fermentation, since bacteria which ferment amylaceous and sugary material and produce normal butyl alcohol as the main or one of the main products of fermentation can be used, and other bacteria which ferment only sugars can be used. In accordance with the invention, the starting mash may have either a high or a low concentration of fermentable carbohydrate, and the bacterial fermentation may be allowed to ferment to substantial completion or not, as may be desired. Although other modifications and variations of the described invention differing from the illustrative embodiments may be made, they are intended to be embraced within the definition set forth in the appended claims, and no limitations are intended except those which are specifically expressed and those which are imposed by the prior art.

I claim:

1. The method of manufacturing solvents by the fermentation of a carbohydrate mash which comprises successively fermenting the mash by the action of bacteria capable of producing solvents including butyl alcohol, and yeast and subjecting the beer produced by the bacterial fermentation to distillation to remove the solvents produced thereby before any of said fermentable carbohydrate is allowed to be acted upon by said yeast.

2. The method of manufacturing organic compounds by the fermentative action of bacteria and yeast on a mash containing carbohydrates which comprises inoculating such a mash with a culture of bacteria capable of producing organic compounds including butyl alcohol, fermenting the inoculated mash, subjecting the resulting beer to distillation to remove the organic compounds produced by the action of said bacteria, inoculating the resulting slop with yeast and allowing said slop to ferment by the action of said yeast.

3. The method of manufacturing solvents by the fermentation of a carbohydrate mash which comprises fermenting the mash by the action of bacteria capable of producing solvents including butyl alcohol, subjecting the resulting beer to distillation to remove the solvents produced by the action of said bacteria, adding fermentable carbohydrate material to the resulting slop, inoculating the slop with yeast, and allowing the slop to ferment by the action of the yeast.

4. The method of manufacturing solvents by fermentation which comprises fermenting a carbohydrate mash by the action of bacteria capable of producing solvents including butyl alcohol, subjecting the resulting beer to distillation to remove the solvents produced by the action of said bacteria, adding fermentable carbohydrate material to the resulting slop before it is cooled, inoculating the slop with yeast, and allowing the slop to ferment by the action of the yeast.

5. In the manufacture of organic compounds including butyl alcohol by the successive fermentative action of bacteria capable of producing organic compounds including butyl alcohol and yeast on a carbohydrate mash, the step which consists in subjecting the beer produced by the bacterial fermentation to distillation to remove the solvents produced, thereby to condition it before it is inoculated with yeast.

6. In the manufacture of organic compounds including butyl alcohol by the successive fermentative action of bacteria capable of producing said organic compounds including butyl alcohol, and yeast on a carbohydrate mash, the steps which consist in heating the beer produced by the action of the bacteria on the mash to a temperature sufficient to pasteurize it, subjecting the beer to distillation to remove the organic compounds produced by the action of said bacteria during said heating, adding carbohydrate material to the resulting slop, inoculating the slop with a culture of yeast, and allowing fermentation to proceed by the action of said yeast.

7. The process in accordance with claim 1 in which the fermentable carbohydrate mash is a solution of molasses.

8. The process in accordance with claim 1 in which the fermentable carbohydrate mash is a solution of molasses which has been acidified and heated to cause inversion of the polysaccharides therein to the more easily fermentable monosaccharides.

JAMES F. LOUGHLIN.